Jan. 14, 1930.   S. TINAGLIA   1,743,987
CONTAINER FOR PLANTS
Filed Nov. 6, 1928   3 Sheets-Sheet 1
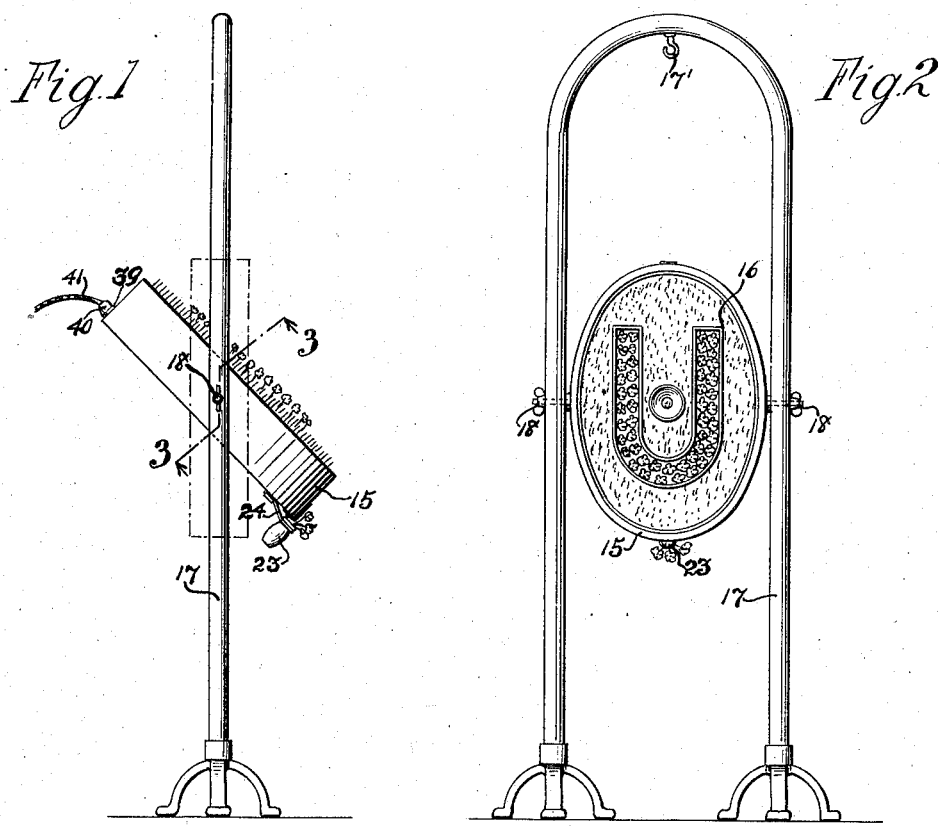
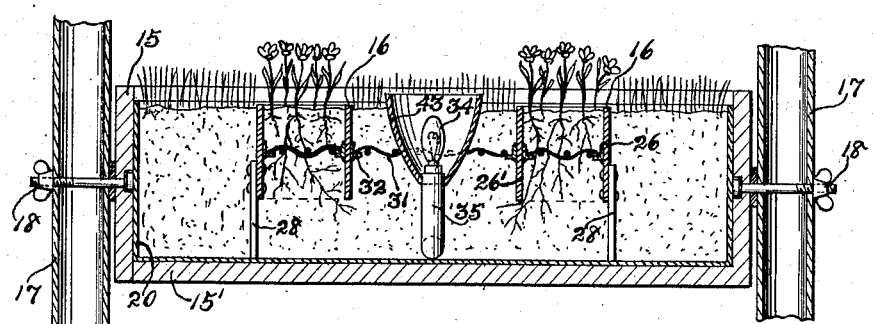
Inventor
Settimo Tinaglia
by J. Daniel Stuwe
Attorney Jan. 14, 1930.  S. TINAGLIA  1,743,987
CONTAINER FOR PLANTS
Filed Nov. 6, 1929  3 Sheets-Sheet 2
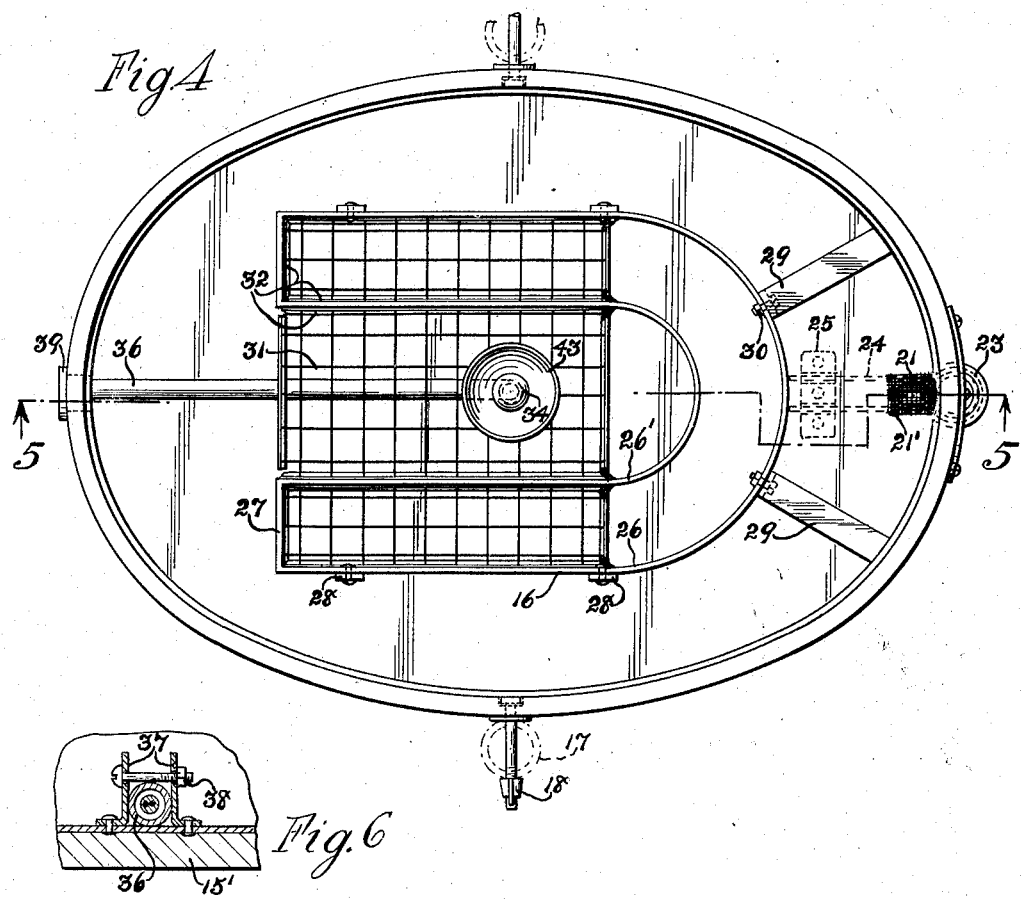
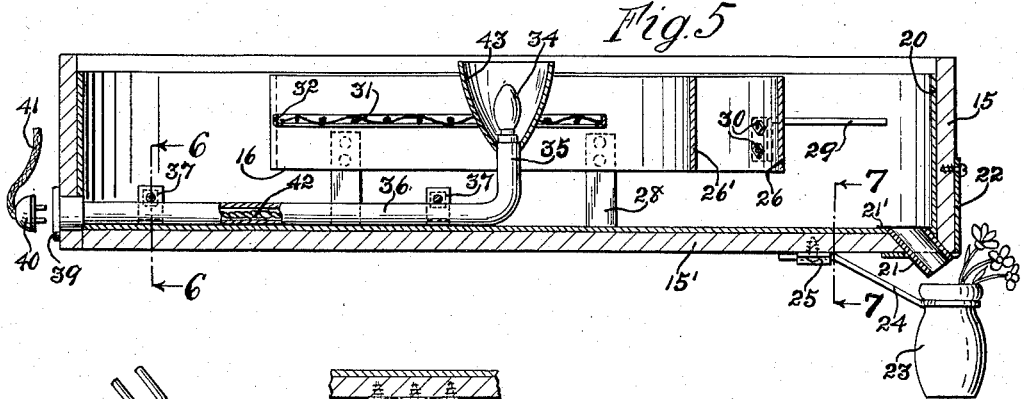
Inventor
Settimo Tinaglia
by J. Daniel Stuwe
Attorney Jan. 14, 1930.  S. TINAGLIA  1,743,987
CONTAINER FOR PLANTS
Filed Nov. 6, 1928   3 Sheets-Sheet 3
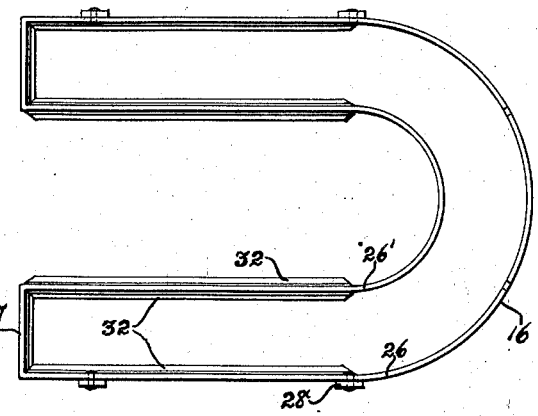
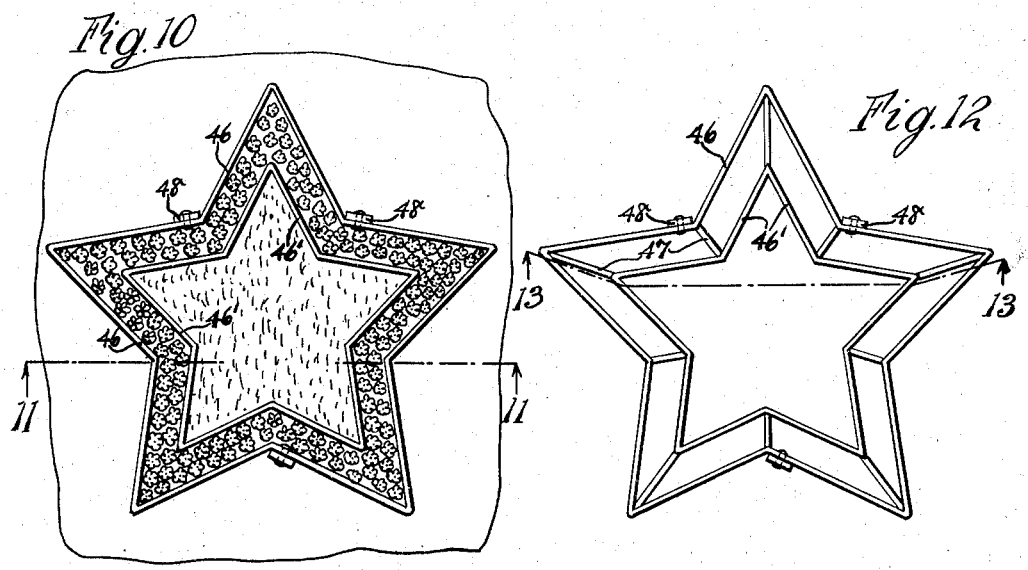
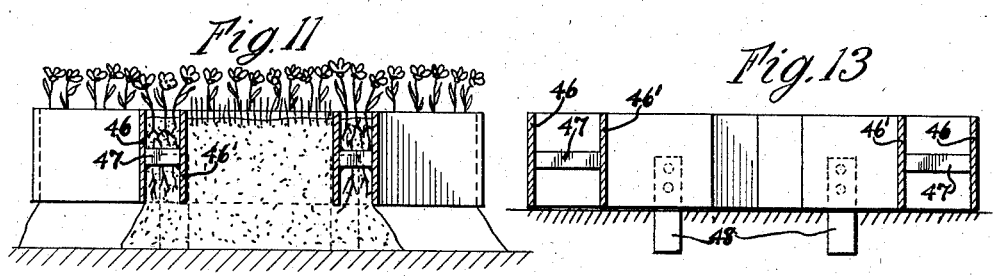
Inventor
Settimo Tinaglia
by J. Daniel Stuwe
Attorney Patented Jan. 14, 1930

1,743,987

UNITED STATES PATENT OFFICE

SETTIMO TINAGLIA, OF CHICAGO, ILLINOIS

CONTAINER FOR PLANTS

Application filed November 6, 1928. Serial No. 317,672.

My invention relates to a container for plants, and more particularly for flowers and grass, and the like.

One of the main objects of this invention is to provide a container or device for holding plants or vegetation, such as flowers, ferns, grass, moss, etc., either the natural plants or the artificial ones. A further object is to provide such a device which comprises an outer or main receptacle or chamber and an inner or smaller receptacle or chamber mounted within said outer one, so as to be particularly adapted for containing different kinds of plants in the two receptacles, like flowers in the inner one and grass in the outer one. Another object is to construct the inner receptacle with double walls or plate walls spaced apart to provide the inner or smaller chamber or receptacle there between, and to mount it so the outer chamber or receptacle is formed between the walls of these two receptacles. Still another object is to construct a receptacle comprising similarly curved plate members arranged to form a double wall and providing a flower chamber of a certain design or symbol, such as an alphabetic symbol or an astronomic symbol between these curved plate members or double wall. A further object is to provide such a receptacle, including similarly curved, spaced side plates without a floor or bottom wall, which has legs to support the side plates spaced above the floor or supporting surface so as to permit spreading of soil and roots under said plates, and also to allow for better drainage. Still a further object is to provide my improved container with a vase or member adapted to receive drainage from the container and at the same time serving as a vase for holding the flowers cut from the container. A further object is to provide the container with illuminating means; also with earth retaining means.

These objects and other objects and advantages are attained with my invention, as will become apparent from the following description, taken in connection with the accompanying drawings, in which Fig. 1 is a side elevation of my container, mounted in its stand or frame, including the inner and the outer receptacles with flowers and grass contained therein;

Fig. 2 is a front elevation thereof;

Fig. 3 is an enlarged cross-sectional view, taken on line 3—3 of Fig. 1;

Fig. 4 is a plan view of the invention;

Fig. 5 is a vertical sectional view, taken on line 5—5 of Fig. 4;

Figs. 6 and 7 are enlarged detailed sections, taken on lines 6—6 and 7—7 of Fig 5;

Fig. 8 is a detail of the removable vase holder;

Fig. 9 is a plan view of an inner receptacle in the shape of an alphabetic symbol;

Fig. 10 is a plan view of a certain one of my inner receptacles, provided in the shape of an astronomic symbol, with flowers and grass contained therein;

Fig. 11 is a cross-sectional view, taken on line 11—11 of Fig. 10;

Fig. 12 is a plan view of said astronomic symbol by itself; and

Fig. 13 is a cross-sectional view, taken on line 13—13 of Fig. 12.

In the drawings I have shown an embodiment of my invention, comprising a combination container or device for holding plants and vegetation, such as flowers, grass, and the like, including a main or outer receptacle 15 of a suitable size and desirable shape and design which has upright walls and a bottom wall or floor 15' thereunder; said combination device also including an inner receptacle 16, mounted in the main receptacle, and which is preferably constructed in the shape of certain symbols, as alphabetic and astronomic symbols, and the like; this inner receptacle being readily removable from the outer receptacle, in order to allow removing and replacing thereof in the outer one by an inner receptacle of a different shape and design, so as to fully suit the particular occasion and the particular desire of the user.

This combination device may be supported on the floor or the ground, but a stand 17 is preferably also provided therefor, and includes suitable fastening means 18 to retain the container in certain positions, so that it may be held substantially horizontal or nearly vertical, or in various inclined positions there between. This device may thus be used with or without the stand, and is well adapted for use within the home, in the yard, park, cemetery, etc. An additional supporting element 17' may also be provided in the top of stand 17 for supporting any additional container or member wished to be added to the combination.

My main or outer receptacle 15 preferably comprises the outer casing of wood or the like, enameled or arranged on its exterior to form a pleasing appearance, and having a water-tight metal casing or lining 20 provided therein. A drain pipe or spout 21 extends through these inner and outer casings and through a front shield or plate 22. A vase 23 is removably mounted under said drain pipe to receive the drainage or drippings therefrom, being preferably mounted by the use of a fork or yoke member 24 which is removably held by loop means 25 under receptacle 15. This vase functions to take care of the drainage from the container and furthermore to receive flowers cut from the inner flower receptacle to keep these flowers fresh by this drainage. A screen 21' may be mounted over pipe 21.

The inner receptacle is preferably provided in the shape of some symbol, as alphabetic, astronomic, geometric, etc., and includes curved companion plates or members 26 and 26' which are spaced apart and have their corresponding portions similarly curved and preferably placed parallel substantially in the form of a double wall, so that this space between these curved plates of this double wall forms a curved chamber in the shape of a letter, star, or similar symbol. These companion plates are fastened or held together in juxtaposition by means of suitable connecting elements, as the connecting ends or plates 27 in the alphabetic form of symbol shown in Figs. 1 to 9. Legs 28 positioned under the plates hold this receptacle spaced above the floor or bottom wall 15' of the outer receptacle 15, to provide sufficient drainage, and allow the roots to spread out through the soil between such plates and bottom wall, as indicated in Figs. 3 and 11; and these legs may also be pressed into the supporting floor when that is soft earth and is not rigid, so as to rest these plates on the ground and the legs act as anchoring means to retain this inner receptacle.

I furthermore provide brace means or brace members 29 between the inner and outer receptacles, and preferably mount the same removably on the inner receptacles, as with screw means 30, so as to readily remove these retaining members when the inner receptacle is used apart from the outer one, as indicated in Fig. 9; but said legs are desirable where the receptacles are used together as a combination container, and especially when the entire container is tilted or inclined, as indicated in Figs. 1 and 2.

I also provide meshed soil-retaining means 31 for use with some form of my inner receptacles, such ones as have extended straight portions, as in the case of the legs of the letter U, illustrated in the drawings, for the purpose of retaining the soil in place therein and preventing any sliding thereof whenever the device is mounted at an inclination or angle from the horizontal position, as indicated in Fig. 1. Supporting means 32 is then also provided in this inner receptacle 16, preferably midway of the plates, for removably mounting this mesh means 31 thereon. This retaining means is needed when the letters are mounted at an angle from the horizontal, and may be left out where the inner receptacle is mounted in a horizontal position.

Illuminating means is also provided for my container, and preferably comprises a lamp or light bulb 34 mounted centrally of the combination of receptacles and removably on the upturned end 35 of a conduit 36 which is removably mounted upon bottom wall 15', as by means of bracket arms 37 and screw means 38, and enters a detachable socket member 39 mounted at the rear wall of receptacle 15, said member 39 receiving a companion part or member 40 on a conductor 41. A suitable conductor 42 in conduit 36, electrically connects members 39 and 34. A shield 43 is mounted on upturned end 35 to keep lamp 34 dry and clean.

As I provide my invention, especially the inner receptacle, in various shapes and symbols, it is deemed advisable to illustrate a further symbol besides the alphabetic symbol U, shown in Figs. 1 to 9, and I have therefore further illustrated an astronomic symbol, in the form of a star, shown in Figs. 10 to 13. This form of symbol, like the alphabetic symbol U, comprises spaced companion plates 46 and 46', which have their corresponding parts similarly curved to provide a curved double wall forming a curved chamber therebetween for containing a certain kind of plant, as flowers, in the outline of a star, and also to provide an inner star thereby for containing some other plant, as grass. Connecting members 47 join these plates to hold them in juxtaposition. Legs 48 are provided on these plates so as to hold them spaced above the supporting floor, and permit the soil and roots to spread outward thereunder, as shown in Fig. 11; and these legs are made thin so that they may be pressed into the soft ground or soil to rest the plates on said ground, and the legs then serve as anchoring means to retain this receptacle in position as indicated in Fig. 13.

It is apparent from the above disclosure that this combination container or device is especially adapted for containing and displaying different kinds of plants, such as flowers and grass, and to form a distinct line of demarkation therebetween, as best indicated in Fig. 1, and that this device may be used horizontally and placed on the ground or floor or similar supporting surface, and may also be used with the stand, as indicated in Figs. 1 and 2, for use in the home or yard, etc.; and furthermore that the inner container may be removed and exchanged with one of a different design, to suit the particular purpose and desire. It is also apparent that the inner container or receptacle may be used apart from the outer one, and that several thereof may be used together to form certain words and outlines; and that in view of the construction of the legs and the general outline of the inner receptacles the same are adapted to be mounted on a rigid surface to be supported thereover and allow the soil and roots to spread out below the plates, and that the legs may be pressed into the earth or soil for anchoring the receptacle thereon, as indicated in Fig. 13 of the drawings.

What I claim as my invention and desire to secure by Letters Patent is:

1. A container of the class described comprising a main receptacle with upstanding walls and a water tight floor thereunder, an inner receptacle mounted in said main receptacle and having walls spaced to form an inner chamber for plants between said walls and providing a further chamber within the innermost of said walls, and also being spaced from the walls of the main receptacle to form an outer chamber therewith for containing other plants, and means for supporting said inner receptacle above the floor of the main receptacle and permit spreading of plant roots and also to provide drainage beneath said inner receptacle, and means for adjustably supporting said container either horizontally or inclined.

2. A container comprising a main receptacle having upstanding walls and a floor, an inner receptacle mounted therein having upstanding walls without a floor and having legs to removably support it with said walls spaced from the main walls and from said floor, said construction providing an outer chamber between the walls of said two receptacles and also an inner chamber between the walls of said inner receptacle for housing and separating different plants and forming distinct lines of demarkation between said different plants, and mesh means positioned at an intermediate elevation between said walls for retaining the soil and plants against upward movement therein.

3. A container for displaying plants, comprising a main receptacle having side and bottom walls, an inner receptacle mounted therein and having double curved walls being open at the bottom to form a curved receptacle therebetween, means on said inner receptacle to support it above the bottom wall of the outer one and to retain it spaced from the side walls of the outer one, means to adjustably support said container either horizontally or at an angle with the horizon, and means to retain the soil in position.

4. A receptacle of the class described, comprising a pair of similarly shaped plate members which are spaced in juxtaposition to provide a curved chamber therebetween and contain plants in the form of a certain symbol, and means mounted midway between said plate members to have soil placed beneath it and to hold the soil and plants in position against upward movement in the receptacle.

5. A receptacle of the class described, comprising a pair of similarly curved plate members arranged substantially parallel to provide a bottomless symbol-shaped chamber for plants therebetween, connecting members for rigidly connecting and holding said plate members together, and means positioned between said plate members and mounted on said connecting members for holding soil and plants against upward movement in said chamber.

6. A receptacle of the class described, comprising a pair of similarly curved plate members arranged substantially concentric to form a chamber therebetween, and mesh means between said members for retaining earth in position while the receptacle is tilted from the horizontal.

7. A receptacle comprising similarly curved plate members arranged to provide a chamber for plants in the form of a certain symbol, legs under said plate members for retaining them spaced from a supporting means therebeneath, to permit spreading of soil thereunder, said legs being also adapted to be pressed into the soil for anchoring the receptacle, and means for firmly holding the plate members together.

8. A receptacle of the class described, comprising a pair of similarly curved plate members spaced and arranged in juxtaposition to provide a curved chamber therebetween, mesh means between said plate members for retaining earth in position therein, and means for removably supporting said mesh means.

9. A receptacle for plants, comprising a pair of similarly curved plate members positioned substantially concentric and having the corresponding portions similarly curved and parallel to provide a curved chamber therebetween for containing plants, means for holding said plate members in juxtaposition, legs for either supporting said plate members above the ground or to be pressed into the ground for anchoring the receptacle, and mesh means and means for removably supporting the same between said plate members to retain the soil in position in said receptacle while the same is inclined from the horizon.

10. A device for containing plants, comprising a main outer receptacle having side and bottom walls, an inner receptacle mounted therein having curved spaced walls to form a curved chamber therebetween and being spaced inward from the main walls to form an outer chamber therewith, an electric light positioned within said inner receptacle, and a watertight tubular conduit supported on the bottom wall, beneath said inner receptacle, and containing conductors extending from said light, the inner end of said conduit being turned upwards and providing the supporting means for said light, and said conduit with conductors and light being removable from the device.

11. A device for containing plants, comprising an outer receptacle, an inner receptacle mounted therein and having double walls to form a chamber for holding certain plants therein, said construction forming an outer chamber between the walls of said two receptacles for containing other plants therein, drain means on said outer receptacle, and a vase with means for removably holding it to receive the moisture from said drain means and also to hold flowers cut from the inner receptacle.

12. A device for containing plants, comprising an outer receptacle, an inner receptacle mounted therein and having walls to form an inner chamber for plants therein and also to form, between said walls and the walls of the outer receptacle, the outer chamber or receptacle for plants, drain means on said outer receptacle, and a container and means for supporting it to receive the moisture from said drain means and to contain plants and display them outwardly of the outer receptacle.

13. A plant container comprising a main outer receptacle having side and bottom walls, an inner receptacle mounted therein having spaced walls to form a chamber therebetween and being spaced inward from the main side wall to form therewith an outer chamber, an electric light in said inner receptacle, a water-tight tubular conduit supported on the bottom wall in said outer receptacle, beneath said inner receptacle, and having an upturned inner end for removably supporting said light, a shield mounted water-tight on said end to surround said light, and a conductor extending from said light through said conduit, said conduit with conductor and light being removable from the container.

In testimony whereof I have signed my name to this specification.

SETTIMO TINAGLIA.